US011899442B2

(12) United States Patent
Kulshreshtha

(10) Patent No.: US 11,899,442 B2
(45) Date of Patent: Feb. 13, 2024

(54) SYSTEM AND METHOD FOR STRUCTURAL HEALTH MONITORING USING INTERNET OF THINGS AND MACHINE LEARNING

(71) Applicant: Livehoooah Technologies Private Limited, Gurugram (IN)

(72) Inventor: Pradit Kulshreshtha, Gurugram (IN)

(73) Assignee: Livehoooah Technologies Private Limited, Gurugram (IN)

( * ) Notice: Subject to any disclaimer, the term of this patent is extended or adjusted under 35 U.S.C. 154(b) by 367 days.

(21) Appl. No.: 17/438,534

(22) PCT Filed: Sep. 30, 2019

(86) PCT No.: PCT/IN2019/050722
§ 371 (c)(1),
(2) Date: Sep. 13, 2021

(87) PCT Pub. No.: WO2020/188585
PCT Pub. Date: Sep. 24, 2020

(65) Prior Publication Data
US 2022/0155773 A1   May 19, 2022

(30) Foreign Application Priority Data

Mar. 16, 2019 (IN) .............................. 201911010335

(51) Int. Cl.
*G05B 23/02* (2006.01)
*G06N 20/00* (2019.01)
*H04W 84/18* (2009.01)

(52) U.S. Cl.
CPC ......... *G05B 23/0283* (2013.01); *G06N 20/00* (2019.01); *H04W 84/18* (2013.01)

(58) Field of Classification Search
CPC . G05B 23/024; G05B 23/0283; H04W 84/18; G06N 20/00

(Continued)

(56) References Cited

U.S. PATENT DOCUMENTS 5,774,376 A   6/1998 Manning
9,979,606 B2  5/2018 Gupta et al.
(Continued)

FOREIGN PATENT DOCUMENTS

CN   102937646 A   2/2013
CN   106453469 A   2/2017
(Continued)

OTHER PUBLICATIONS

Lamonaca et al., "Internet of Things for Structural Health Monitoring", Publication Date: Apr. 1, 2018, Published in: 2018 Workshop on Metrology for Industry 4.0 and IoT (pp. 95-100) (Year: 2018).*

(Continued)

*Primary Examiner* — John H Le
(74) *Attorney, Agent, or Firm* — Brett A. Schenck

(57) ABSTRACT

The present invention discloses a system and method for structural health monitoring to identify structural anomaly and to predict structural integrity of civil structures on real time basis by evaluating feasibility of wireless structural health monitoring (SHM) of civil structures encompassing internet-of-things (IOT) and machine learning models (8). The system includes a sensor (S) connected to node processor (1, 1a, 1b, 1c, . . . 1n), physical device gateway (2), cloud gateway (4), trigger function software client (5), graphic user interface or dashboard (9) and communication module (C). The system evaluates incoming real-time engineering data on the cloud gateway (4) and allows a trigger function to route the engineering data to cloud storage (6b) and cloud analytics (6a) and alert system (6c). The system gives a single conditional statement in real-time by correlating predictions of multiple structural integrity parameters of the civil and mechanical engineering structures.

20 Claims, 9 Drawing Sheets

(58) Field of Classification Search
USPC .......................................................... 702/34
See application file for complete search history.

(56) References Cited

U.S. PATENT DOCUMENTS

2018/0136085 A1    5/2018    Lochry et al.
2019/0265689 A1    8/2019    Schaefer

FOREIGN PATENT DOCUMENTS

WO    WO2003016852 A1    2/2003
WO    WO2018087316 A1    5/2018

OTHER PUBLICATIONS

J.P. Lynch, K. H. Law, A. S. Kiremidjian, T. W. Kenny, E. Carryer and A. Partridge, The Design of a Wireless Sensing Unit for Structural Health Monitoring, http:/eil.stanford.edu/WiMMS/shmwspaper.pdf, Proceeding of the 3rd International Workshop on Structural Health Monitoring, Sep. 12-14, 2001, Standford, CA, USA.

Tokognon, C. Aradius, et a;., "Structural Health Monitoring Framework Based on Internet of Things: A Survey", IEEE Internet of Things Journal 4.3 (2017): p. 619-635.

The International Search Report for International Application No. PCT/IN2019/050722, dated Jan. 21, 2020.

The Written Opinion of the International Searching Authority for International Application No. PCT/IN2019/050722, dated Jan. 21, 2020.

Examination Report for Indian Application No. 201911010335, dated Nov. 20, 2019.

* cited by examiner

SYSTEM AND METHOD FOR STRUCTURAL HEALTH MONITORING USING INTERNET OF THINGS AND MACHINE LEARNING

CROSS REFERENCE TO RELATED APPLICATIONS

The present Application is a national stage of International Patent Application No. PCT/IN2019/050722, titled "System and Method for Structural Health Monitoring Using Internet of Things and Machine Learning", filed Sep. 30, 2019, which claims priority to Indian Application No. 201911010335 filed Mar. 16, 2019, the contents of which are incorporated by reference.

FIELD OF INVENTION

The present invention presents a system for structural health monitoring using internet of things and machine learning. More particularly, the system of the present invention detects structural anomalies of civil and mechanical engineering structures through wireless real-time data communication between sensors or actuators, node-processors, gateways and cloud platform and gives a single conditional statement in real-time by correlating predictions of multiple structural integrity parameters of the civil and mechanical engineering structures. The present invention also presents a method to operate the system of the present invention that bridges the gap between multidisciplinary systems to identify structural anomalies through wireless real-time data communication between sensors or actuators, node-processors, gateways and cloud platform and predict the structural integrity of the structures.

BACKGROUND OF THE INVENTION

Each kind of structure including essential structures such as bridges, dams, tunnels, high rise buildings experience a decline in structural integrity over time due to various environmental challenges such as earthquake, tsunamis, floods, landslides and hurricanes, and man-made challenges such as terrorism and poor construction. Thus, it becomes paramount that structural integrity loss is perceived well in advance so that preventive maintenance can be done to avoid any disaster in terms of loss of human life and economy.

Present structural health monitoring systems require the installation of long distances of optical fibre to connect the data logger to the sensors or actuators. The physical size and price of the data logger increase significantly as the number of sensors to be connected to it increases. It is therefore not possible to easily attach a quantity of one million sensors or actuators to a single physical data logger via optical fibres. In addition, data authentication between data logger and sensors is lacking in present systems to prevent unauthorized access. Furthermore, the network server in present systems does not have the capability to use Simple Query Language (SQL) query to extract relevant information from unstructured data for improving the prediction of structural integrity.

US20180136085A1 discloses a structural health monitoring system consisting of sensors and/or sensor modules attached to or near one or more parts or regions of a structure that detect and measure data on physical or related characteristics or phenomena associated with the structure before, during and after a load or other event that affects or otherwise affects the structure. The sensor modules measure and convert the detected phenomena into digital data and transmit the data for data compilation, storage and analysis to a master station. The master station is configured to produce analytical work product based on sensed phenomena that are useful to assist inspectors in determining what action to take in relation to the health of a structure after an event. The US20180136085A1 system does not provide prediction and anomaly detection through machine learning models of structural integrity of a structure. Furthermore, there is an absence of communication protocol to prevent unauthorized data access. In addition, the use query for extracting relevant features is not done to improve the structural integrity prediction. In addition, the communication module consists of Wi-Fi and LAN (Local Area Network) for data communication between the node, local data hub (LDH) and the master station.

WO2003016852A1 discloses a device used to monitor structures dynamically in real time. The inventive device consists of an acceleration detection device, a data acquisition and calculation system, an energy supply system, and a communication system that provides continuous information on changes in the monitoring structure. Such device deduces velocities, movements and frequencies of motion in relation to the structure by means of the acceleration measurement in order to determine the state of the same at any time. In addition, the inventive device, together with a central node, forms an assembly that is used for dynamic structural monitoring and provides real-time information on the status of the monitored structure(s). The WO2003016852A1 system is limited to measuring dynamic velocity, displacement and acceleration of the structure in real time. There is an absence of remote monitoring and remote data acquisition system. Prevention from unauthorized access through communication protocol is absent. Moreover, there is an absence of delivery mechanism for sending instructions from data acquisition system back to sensor module for computation. The WO2003016852A1 system also does not provide prediction and anomaly detection through machine learning models of structural integrity of a structure.

U.S. Pat. No. 5,774,376A discloses a system to monitor the structural integrity of a mechanical structure. To characterize the structure's health, the system uses a trainable adaptive interpreter such as a neural network to analyze structure data. In response to an input signal, a vibration-generating actuator is attached to the mechanical structure. Also attached to the mechanical structure, a sensor senses the vibrations and generates a response signal. The sensor output signal is then combined with an adaptive interpreter pre-trained to generate an output that characterizes the structural integrity of the mechanical structure. The system of U.S. Pat. No. 5,774,376A is limited to detecting the anomalies of structural Integrity using neural networks. The system does not provide prediction of future values of incoming structure's health data. Furthermore, prevention of unauthorized access through communication protocol is absent. In addition, the system does not consist of wireless data transfer, monitoring and acquisition.

"The Design of a Wireless Sensing Unit for Structural Health Monitoring"; Lynch J. P. et. al. (http:/eil.stanford.edu/WiMMS/shmwspaper.pdf) provides proof of concept for an integrated wireless monitoring system. The system benefits from installations that are cheaper and faster. They hold the promise to be able to perform computationally intensive procedures in real time with computational power being pushed to the sensing units from a central data acquisition system. However, the study does not provide any reference to prediction capability and anomaly detection through machine learning models. Moreover, there is an absence of communication protocol to prevent unauthorized access. There is also a lack of an alarm system.

There is an urgent need for a process that bridges gap between interdisciplinary systems to perceive structural integrity loss well in advance while protecting data from unauthorized access and enabling remote monitoring even in regions where node-to-gateway data communication is hindered by the absence of mobile network internet and Wi-Fi.

OBJECT OF THE INVENTION

The main object of this present invention is to provide a system for structural health monitoring using internet of things and machine learning.

Another object of the present invention is to provide a system for monitoring the structural health of civil and mechanical engineering structures to ensure secure data transfer, implement real-time data to trigger function and/or analytics and/or alarm, and enable the system to connect to one or more machine learning models to help the user identify structural behaviour anomalies and forecast trends.

Yet another object of the present invention is to provide a system for monitoring the structural health of civil and mechanical engineering structures to implement cloud-based alarm systems that could provide users with real time alerts via emails, text and social media messages.

Yet another object of this invention is to provide a system for monitoring structural health of civil and mechanical engineering structures in order to extract crucial information in a manner to detect and/or forecast anomaly detection due to machine learning models.

Yet another object of this invention is to provide a system for monitoring the health of civil and mechanical engineering structures with low data acquisition costs for large number of sensors or actuators.

Yet another object of this invention is to provide a scalable system for monitoring structural health of civil and mechanical engineering structures so that data can be communicated wirelessly between node-processor attached to the sensors or actuators and the gateway.

Yet another object of the present invention is to provide a method of operation of a scalable system for monitoring the structural health of civil and mechanical engineering structures to ensure secure data transfer, implement real-time data to trigger function and/or analytics and/or alarm, and enable the system to connect to one or more machine learning models to help the user identify structural behaviour anomalies and forecast trends.

Yet another object of the present invention is to provide a method of operation of a scalable system for monitoring structural health of civil and mechanical engineering structures in order to extract crucial information from unstructured data, convert unstructured data into structured data and create new features within the data to detect and/or forecast anomaly due to machine learning models could be more accurate.

Yet another object of this invention is to provide a method of operation of a scalable system for monitoring structural health of civil and mechanical engineering structures so that data can be communicated wirelessly between node-processor attached to the sensors or actuators and the gateway.

Yet another object of the present invention is to provide a method for monitoring structural health of civil and mechanical engineering structures in order to visualize data forecast.

Yet another object of this invention is to provide a method for monitoring the health of civil and mechanical engineering structures on a visualization platform using advanced functions to correlate forecasts of all separate structural integrity parameters in order to provide contextual narrative statements.

Yet another object of this invention is to provide a method for monitoring the health of civil and mechanical engineering structures with low data acquisition costs for large number of sensors or actuator

SUMMARY OF THE INVENTION

Accordingly, the present invention provides a method for monitoring the health of civil and mechanical engineering structures on real-time basis and to predict future structural integrity of said structures through wireless transmission of data generated from sensors/actuators.

In one embodiment of the invention, the system comprises of sensors or actuators which are attached to a node processor which converts raw sensor data into engineering data and receives cloud instructions/algorithms and performs advanced analysis without the need for data to be sent to the cloud for analysis.

The system also comprises of long range closed network communication module such as LoRaWAN communication module that enables the node-processor to establish wireless communication with the physical device gateway. Using LoRaWAN in applications of structural health monitoring makes it possible to install the entire framework in remote locations where there is long range, low power and no internet signal and mobile network.

In another embodiment of the invention, the system comprises of two types of gateways. The first type of gateway is a physical device gateway that communicates data wirelessly with node processor and communicates the data with cloud. It communicates through LoRaWAN with the nodes. It sends data or receives instructions from the cloud via the internet (for example mobile network internet, Wi-Fi, ethernet, etc.).

The second type of gateway is a cloud internet of things gateway that wirelessly authenticates and communicates data with physical device gateway/node processor through the internet. It is enabled with both, device to cloud and cloud to device data transfer. Device to cloud data transfer via cloud internet of things gateway incorporates physical device-to-cloud data telemetry and determines physical device status and defines which internet of things device on cloud receives what credentials-based data. Cloud to device data transfer via cloud internet of things gateway sends commands to physical devices and tracks the delivery of messages.

The system also comprises of a message broker cloud application that is used to set up a communication protocol for authenticating gateway data communication.

In one embodiment of the invention, the system comprises of a cloud-based application that is used to trigger when certain keywords or thresholds appear within the incoming cloud internet of things gateway data. This application routes the data to be further processed and/or stored in a database and/or filtered and/or visualized and/or raise an alarm and/or call a function.

The system also comprises of cloud based analytics that is used to query data to extract relevant information from unstructured data for the purpose of improving the accuracy of prediction and converts unstructured data into structured data, enrich data with mathematical activity, send processed data for storage and send the dataset for direct visualization on dashboard.

The system also comprises of a cloud storage that can store data in real time and can be connected in real time to machine learning models and data visualization platform.

The system generates an alarm by identifying the topic to which physical device messages are published and allowing access control by defining policies to determine which internet of things cloud device and which subscriber can communicate with the topic.

In an embodiment of the invention, results of support vector machine, principal component analysis and neural network machine learning models are compared, and the most precise model is used for anomaly detection while K-means clustering algorithm and random cut forest algorithm is used in generating machine learning model to predict future values of parameters that constitute structural member behaviour under applied loads.

The present invention also discloses a method to operate the system for monitoring the health of civil and mechanical engineering structures on real-time basis and to predict future structural integrity of said structures through wireless transmission of data generated from sensors/actuators.

The method of the present invention employs low power long range communication module to establish secure communication locally between the several nodes attached to sensors and the gateway without the need of internet. The gateway is enabled with internet which allows seamless transfer of data to the cloud where telemetry of messages gets filtered, queried, stored and analyzed. The data gets extracted wirelessly in the form of data packets which is directly sent to the cloud for storage. Therefore, the method allows the user to have end to end wireless transmission.

This invention employs machine learning and Internet of Things technology to predict the future maintenance of civil and mechanical engineering structures through wireless mode enabling users to take early decisions on maintenance and rehabilitation.

The prediction of structural health data sent by machine learning algorithm for real-time visualization enters a specified mathematical function that correlates the prediction values and compares them with the threshold values of each separate structural health parameters. Conditional real-time narrative with single remark enables the user to determine whether future structural integrity will be compromised. The mathematical function changes with the type of structure and the type of sensors/actuators used and is predefined in the visualization platform before any data is received. The statements in the visualization platform change in real-time as different parameter values forecast change.

Figure 1:
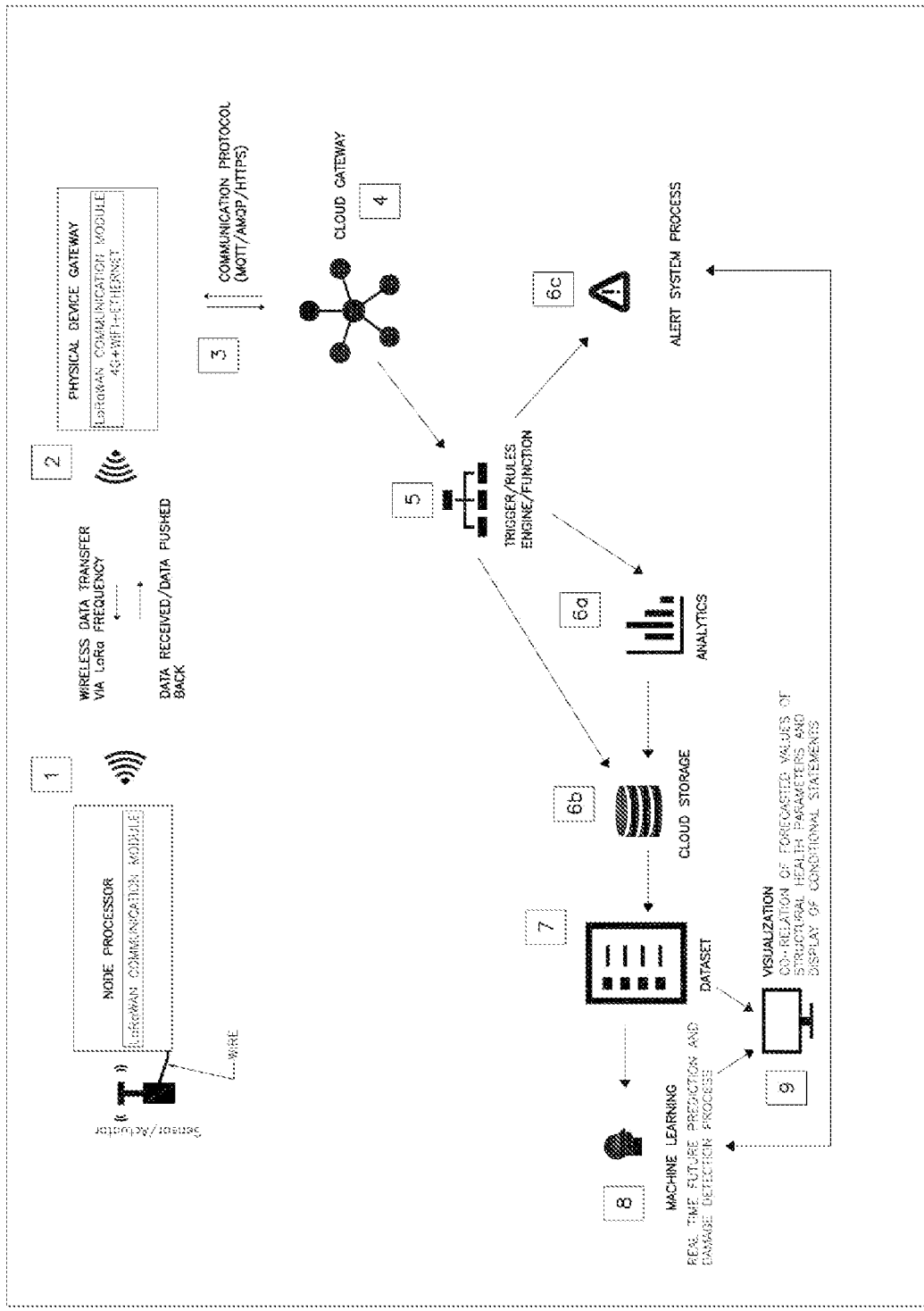
FIG. 1 depicts system architecture of structural health monitoring using internet of things and machine learning.

DETAILED DESCRIPTION OF THE INVENTION WITH ILLUSTRATIONS AND NON-LIMITING EXAMPLES

Accordingly, the present invention provides a system for structural health monitoring using internet of things and machine learning. In particular, the system identifies structural anomalies of civil and mechanical engineering structures by means of wireless real-time data communication between sensors, gateways and cloud platform, and predicts the structural integrity. The present invention evaluates the feasibility of wireless structural health monitoring (SHM) of civil structures encompassing internet-of-things (TOT) and machine learning technologies. The system identifies structural anomalies of civil and mechanical engineering structures through wireless real-time data communication between sensors, gateways and cloud platform and predicts and forecasts health of civil structures.

The present invention also provides a method to operate the system for structural health monitoring, capable of real-time structural health prediction and defect identification based on real-time wireless transmission of sensor/actuator data. This method enables bridging the gap between the Internet of Things (TOT), machine learning for structural health monitoring.

The system ensures secure data transfer, implement real-time data to trigger function and/or analytics and/or alarm, and enable the system to connect to one or more machine learning models to help the user identify structural behaviour anomalies and forecast trends. The system for monitoring the structural health of civil and mechanical engineering structures implement cloud-based alarm system that could provide users with real time alerts via emails, text and social media messages. The communication protocol client uses MQTT, AMQP and HTTPS to authenticate communication between the physical device gateway and cloud gateway, thereby making the system secure.

The system is cost effective and industrially scalable system with low data acquisition costs for large number of sensors or actuators. The data can be communicated wirelessly between node-processor attached to the sensors or actuators and the gateway. The system doesn't require physical channels to be installed at the gateway or node-processor for data transmission. The IOT software client on the cloud server allows the registration of IOT device where data is stored, the node-processor and the gateway provides wireless data transmission pipeline from sensors/actuators to the cloud server, thereby making the system cost-effective and suitable even for remote areas with no internet connectivity.

The present invention also provides a method of operation of the scalable system for monitoring structural health of civil and mechanical engineering structures in order to extract crucial information from unstructured data, convert unstructured data into structured data and perform feature engineering to improve the prediction of structural integrity and identification of structural anomalies.

The method of the present invention enables real-time monitoring of the health of civil and mechanical engineering structures on a visualization platform using advanced functions to correlate forecasts of all separate structural integrity parameters in order to provide contextual narrative statements so that users do not need to look at multiple prediction graphs and understand just how the structure will act based on the sentence.

The system of the present invention comprises one or more sensors (S) or actuators, one or more physical device gateway (2, 2a, 2b, 2c, . . . 2n), a cloud gateway (4), one or more node-processor (1, 1a, 1b, 1c, . . . 1n), communication module (C), communication authentication software client (3), trigger function software client (5), cloud analytics (6a), cloud storage (6b), message topic based software client for alarm (6c), dataset with real-time context based forecasted alerts (7), machine learning model (8) and dashboard (9) for visualization of dataset (7) and resultant data after machine learning analysis. (FIG. 1).

The one or more sensors or actuators (S) are attached to said one or more node processor (1, 1a, 1b, 1c, . . . 1n), which converts raw sensor data into engineering data, receives cloud instructions and performs advanced analysis without the need for data to be sent to the cloud for analysis. Single node processor (1, 1a, 1b, 1c, . . . 1n) can connect multiple sensors (S). (FIG. 1).

The communication module is preferably LoRaWAN communication module (L) that enables the node-processor (1, 1a, 1b, 1c, . . . 1n) to establish wireless communication with the physical device gateway (2, 2a, 2b, 2c, 2n). Using the LoRaWAN (L) in applications of structural health monitoring makes it possible to install the entire framework in remote locations where there is long range, low power, no internet signal and mobile network. The message broker cloud application is used to set up a communication protocol for authenticating gateway data communication. (FIG. 1).

In a preferred embodiment, the system comprises of two types of gateways. The first type of gateway is a physical device gateway (2) that communicates data wirelessly with the node processor (1, 1a, 1b, 1c, . . . 1n) and communicates the data with cloud gateway (4). It sends data through LoRaWAN to the nodes. It sends data or receives instructions from the cloud via internet (for example mobile network internet, Wi-Fi, ethernet, etc.). The second type of gateway is a cloud internet of things gateway (4) that wirelessly authenticates and communicates data with the physical device gateway (2) and the node processor (1) through the internet. It is enabled with both, the physical device (2) to the cloud and the cloud to the physical device (2) data transfer. Said physical device gateway (2) to said cloud data transfer via cloud internet of things gateway (4) incorporates physical device (2)-to-cloud data telemetry and determines physical device status and defines which internet of things device on cloud receives what credentials-based data. Cloud to device data transfer via said cloud internet of things gateway (4) sends commands to physical devices and tracks the delivery of messages. (FIG. 1).

In one embodiment of the invention, the system comprises of a cloud-based application that is used to trigger when certain keywords or thresholds appear within the incoming cloud internet of things gateway data. This application routes the data to be further processed and/or stored in a database and/or filtered and/or visualized and/or raise an alarm and/or call a function. A threshold is defined using Simple Query Language for each SHM parameter, the trigger function then evaluates the incoming real-time data on the cloud server and routes the data to the desired application/service.

The system also comprises of cloud based analytics (6a) that is used to query data to extract relevant information from unstructured data for the purpose of improving the accuracy of prediction and enable users to convert unstructured data into structured data, enrich data with mathematical activity, send processed data for storage and send the dataset for direct visualization on dashboard (9). The system also comprises of a cloud storage (6b) that can store data in real time and can be connected in real time to machine learning models and data visualization platform (9). (FIG. 1)

The system generates an alarm (6c) by identifying the topic to which physical device messages are published and allows access control by defining policies to determine which Internet of things cloud device and which subscribers can communicate with the topic.

Figure 2A:
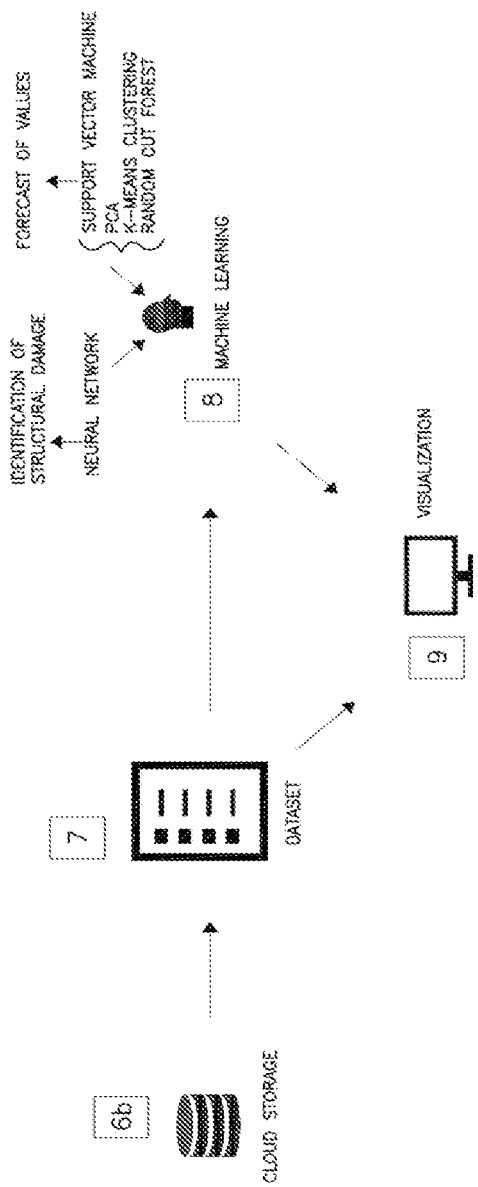
FIGS. 2a and 2b depicts diagrammatic and flow chart presentation of machine learning process of the system respectively.
Figure 2B:
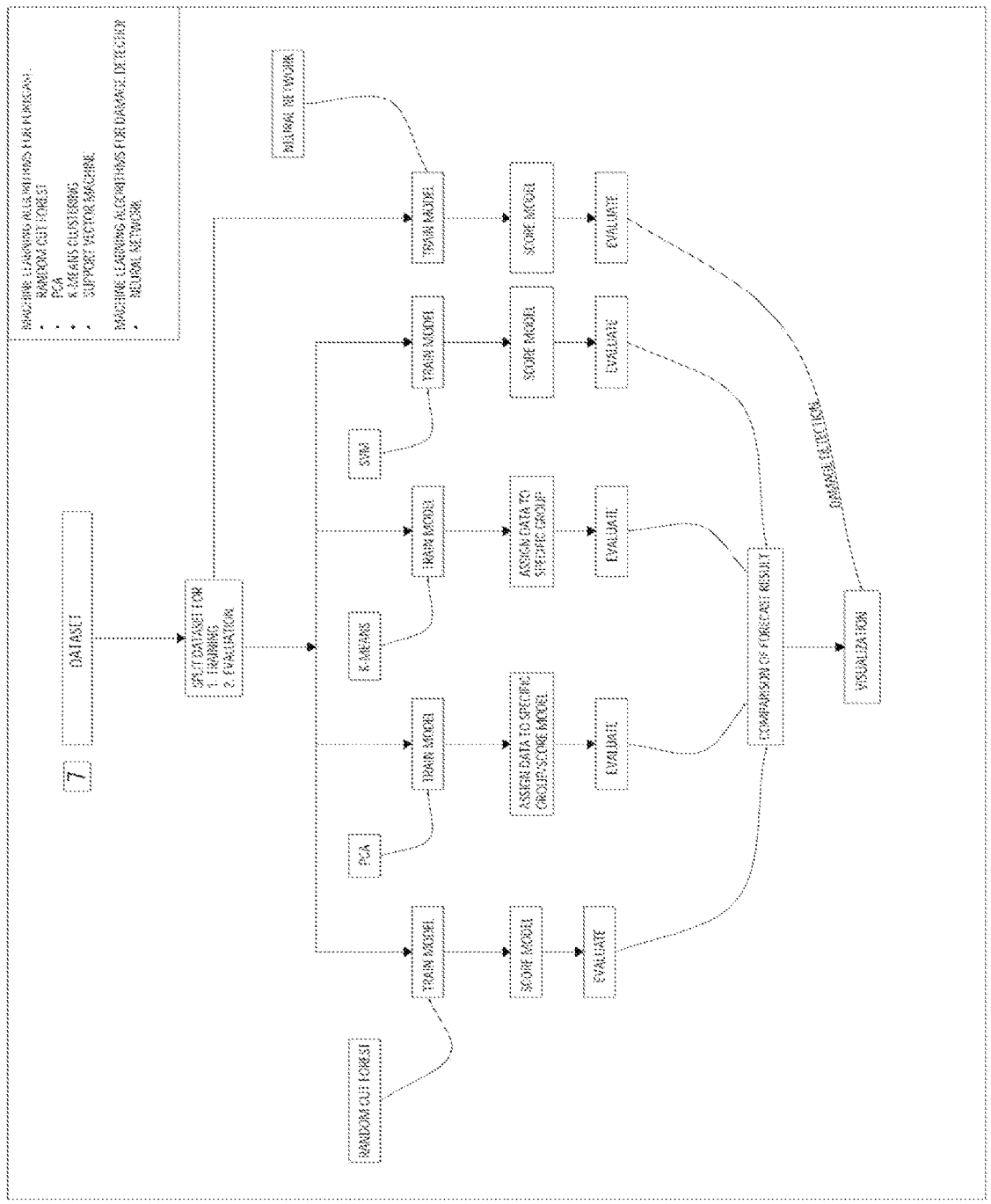

In an embodiment of the invention, the data stored on cloud storage (6b) are provided in the form of dataset (7). The data are sent to machine learning models (8). The machine learning models (8) comprises of random cut forest, support vector machine, principal component analysis, K-Means clustering and neural network machine learning models. The neural network machine learning model is used to identify structural anomaly and damage detection in real-time, whereas said random cut forest, support vector machine, principal component analysis, K-means clustering machine is used to predict future values of parameters that constitute structural member behavior under applied loads. The data received from machine learning models are compared, and the most precise model is used for anomaly detection and forecasting. Both dataset (7) and the forecasted data after machine learning can be visualized on dashboard. (FIGS. 2a and 2b).

The present invention also discloses a method to operate the system for monitoring the health of civil and mechanical engineering structures on real-time basis and to predict future structural integrity of said structures through wireless transmission of data generated from sensors/actuators.

The method of the present invention employs low power long range communication module to establish secure communication locally between the several nodes attached to sensors and the gateway without the need of internet. The gateway is enabled with internet which allows seamless transfer of data to the cloud where telemetry of messages gets filtered, queried, stored and analyzed. The data gets extracted wirelessly in the form of data packets which is directly sent to the cloud for storage. Therefore, the method allows the user to have end to end wireless transmission.

This invention employs machine learning and Internet of Things technology to predict the future maintenance of civil and mechanical engineering structures through wireless mode enabling users to take early decisions on maintenance and rehabilitation.

The method to operate the system of the present invention for monitoring the health of civil and mechanical engineering structures on real-time basis to identify and predict future structural integrity of said structures through wireless transmission of data, said method comprises the steps of deploying said at least one sensor or actuator (S) to collect raw sensor data, connecting each of said sensor (S) to said at least one node processor (1, 1a, 1b, 1c, . . . 1n) to convert said raw sensor data into engineering data, transferring said engineered data to said physical device gateway (2) via said closed network communication module where said physical device gateway (2) aggregates and validates said engineering data, transmission of said validated data from said physical device gateway (2) to said cloud gateway (4) through a secure communication protocol (3), transmission of said validated data from said cloud gateway (4) to said trigger function software client (5) that evaluates the incoming real-time data on the cloud gateway (4) and to trigger function to route said real-time data to said cloud storage (6b) or cloud analytics (6a) or alert (6c) depending upon predefined keywords or threshold on the cloud gateway (4), display of said data as the dataset on dashboard (9) wherein conclusive conditional statement about real-time structural anomalies and forecast trends based on correlated analytics of multiple parameters is displayed, wherein said method employs machine learning models (8) and Internet of things to predict the future maintenance and identity structural anomalies of civil and mechanical engineering structures through wireless data transfer enabling users to take early decisions on maintenance and rehabilitation. (FIG. 1). The method is automated, cost-effective, user friendly and scalable method.

Non-Limiting Experimental Data

Figure 3A:
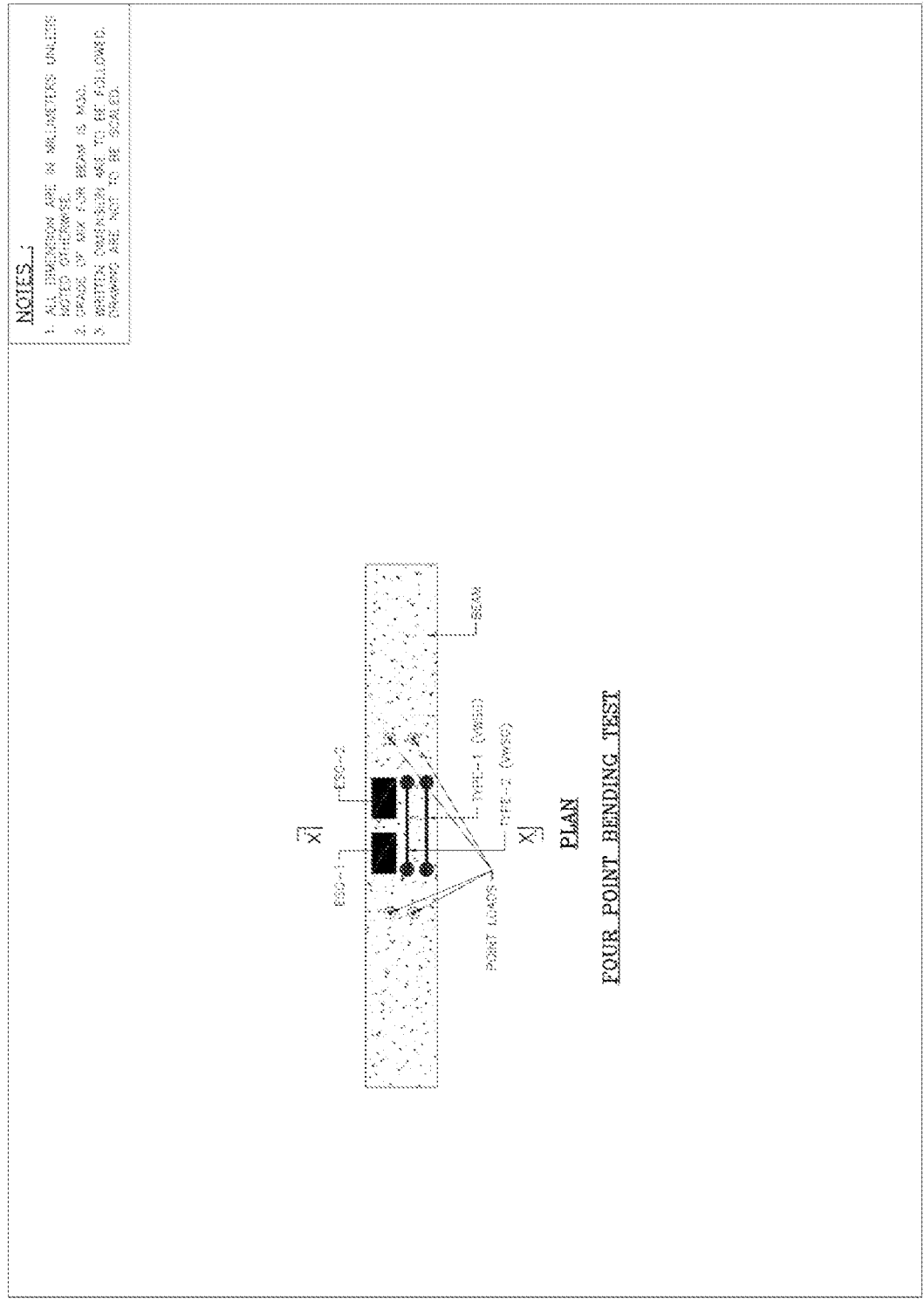
FIGS. 3a and 3b depicts four-point bending test.
Figure 3B:
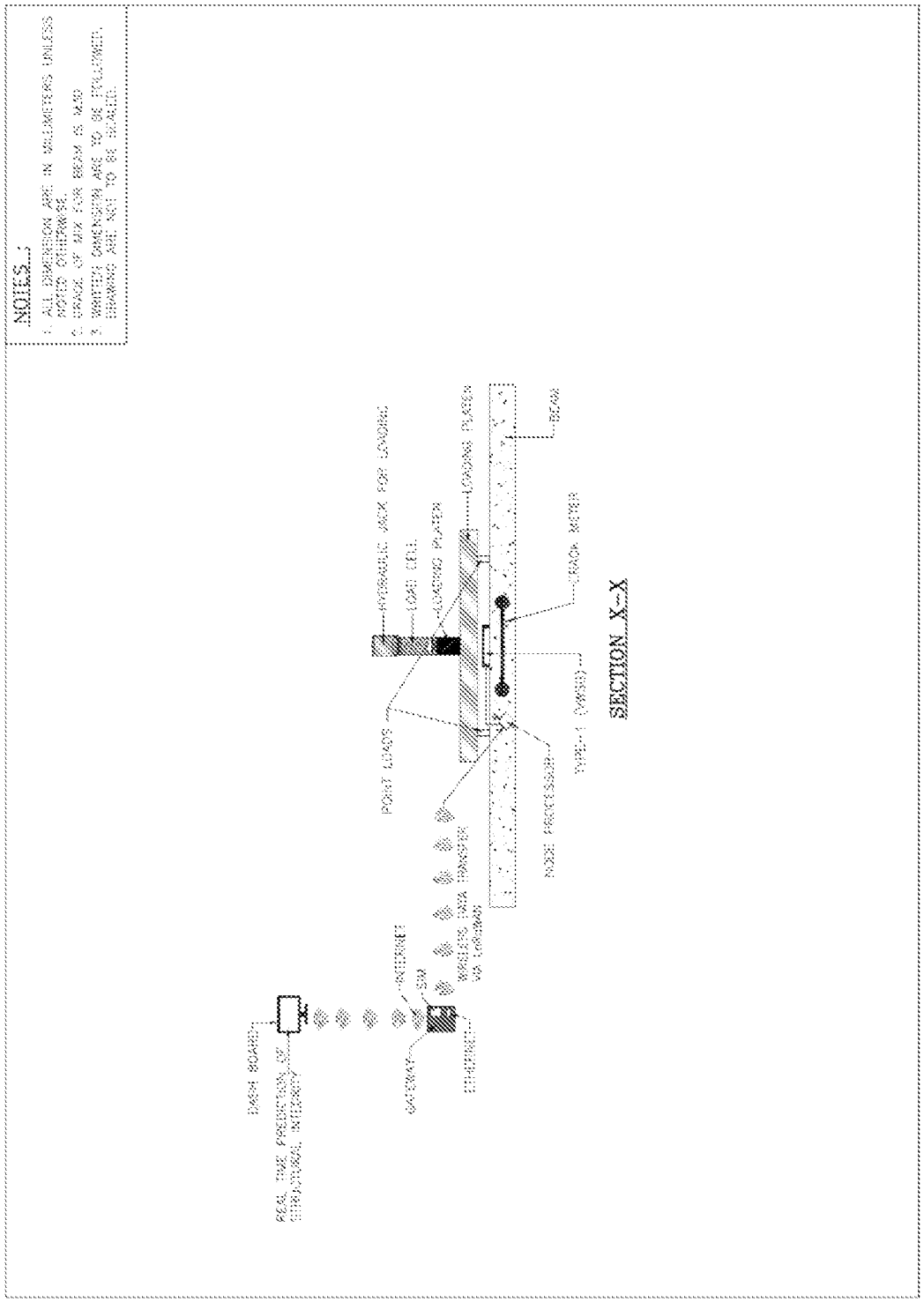

In an exemplary embodiment, the system comprises two sensors, a node processor and two gateways. The sensors comprise of vibrating wire strain gauge (VWSG) or crack-meter or both. The sensor has a thermostat embedded which records the temperature around the sensor, hence, making it capable of incorporating temperature compensations. A node processor reads a sensor data and transmits it to a physical device gateway. The physical device gateway further transmits the acquired data to the cloud where it is recorded and is kept in a secure manner. In the present study, both the sensors are connected to a single node processor. The node automatically switches between the sensors for reading the data. The node processor is connected to the sensors through cables and transmits data to the physical device gateway (2) in a wireless manner, preferably through LoRaWAN. The physical device gateway (2) works on a smart device such as a mobile or other device with graphic user interface which further transmits the data to the cloud gateway (4) in a wireless manner. (FIGS. 1, 3a and 3b)

The experimental results are from a series of laboratory tests carried out on a reinforced concrete (RC) beam. A vibrating wire strain gauge (VWSG) and a vibrating wire crack-meter have been installed on the test RC beam under flexure. The VWSG and two electrical strain gauges have been installed on the beam for comparison purposes. The loads have been applied in stages using a manual hydraulic jack and the strain from the VWSG has been recorded from a separate handheld data logger. The strain from the electrical strain gauges is acquired through the data logger. The results obtained from all of them have been compared to evaluate the present invention.

Load-strain curve and strain-time plots have been plotted and compared for all the sensors. The experimental results demonstrate the readings from VWSG of the present invention showing a similar trend like other sensors, with increasing load. The wireless system has proved its potential in recording accurate values from the sensors and transmitting them in real time to the cloud server. The system also raised an alarm in the form of mobile text and email upon reaching the strain value above a preset threshold level. The system efficiently reads the data from sensors and logs the data in the cloud server through the wireless mode. The data can be retrieved from anywhere in the world through mobile phones and personal computers enabled with internet.

Real Time Wireless Data Transmission

The wireless monitoring system provides real-time wireless transmission of data to the cloud gateway. The sensors attached to a node processor wirelessly send the data to a device gateway which aggregates the data and establishes a secure connection with cloud gateway. The measurements have been checked for every minute and found to be transmitted/received for each time-stamp and thus confirms the real-time transmission.

Remote Monitoring

The system displays measurements through a dashboard which could be accessed from any device such as computer, laptop, tablet and mobile via internet. There is no barrier on proximity and geographic location of data logging and monitoring device from the sensors.

Mode of Communication for Data Transmission

The node processor (1) attached to the sensors (S) sends the data to a physical device gateway (2) wirelessly without the need of internet. The device gateway (2) is enabled with the internet and/or ethernet or both to send the data aggregated from the node-processor (1) to the cloud gateway. (FIGS. 1, 3a and 3b)

Alert System

The system sends alerts via SMS text messages and email for a given threshold assigned for crack-width and strain values.

Verification of Data Displayed

The system correctly displays the measurements of the crack-meter, strain-gauge and temperature sensor in the dashboard. The sensors need to be calibrated in advance before using in the field as the values displayed on the dashboard are sent by node-processor which applies suitable algorithms to convert measured frequencies into strain, crack-width and temperature values.

Forecast Capability

Figure 7:
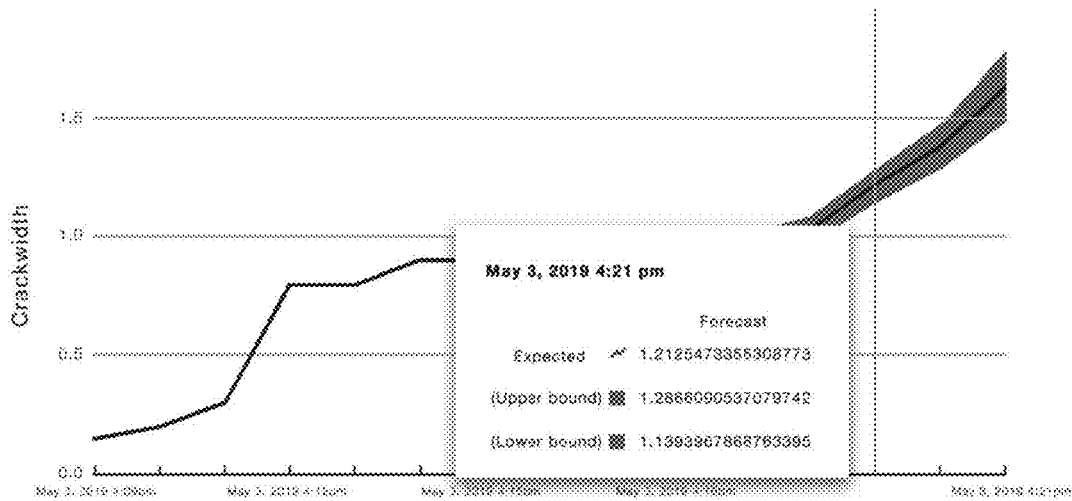
FIG. 7 depicts forecast data of crack width with upper and lower bound results.
Figure 8:
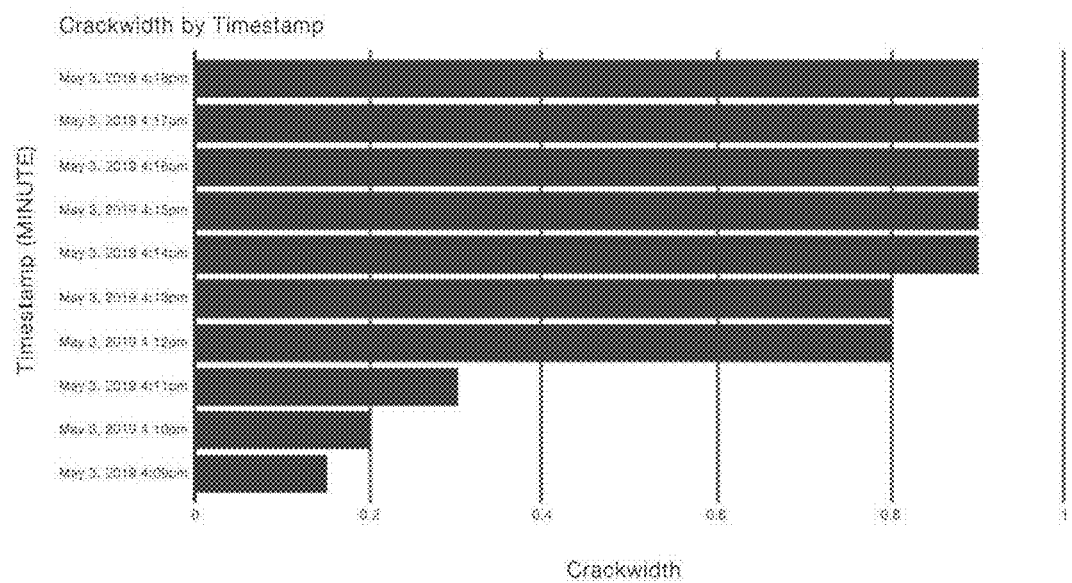
FIG. 8 depicts dashboard for crack width values of crack-meter.

The dashboard (9) of FIG. 2a displays a forecast of upper-bound, lower-bound and expected parameter values measured by the sensors (S) (detail illustration in FIG. 7). Predictability depends on the quantity and quality of data logged on the cloud server.

Experiment 1: Four-Point Bending Test

A RC beam of dimensions 150×130×2000 mm with a 28-day cube compressive strength of 30 MPa have been used to validate the wireless real-time monitoring and prediction system of the present invention. The sensors have been instrumented at the mid-span of the beam as shown in the plan and section x-x of FIGS. 3a and 3b respectively. Two electrical strain gauge (ESG) 60 mm and a TYPE 2 Vibrating Wire Strain Gauge (VWSG) were also installed alongside the sensors of the present invention. The beam was subjected to four-point bending test till failure. The loads were applied using a manual hydraulic jack in 2.5 kN steps, however, the first step load was of 5 kN. The boundary conditions were simply supported so that the near maximum strain and flexural cracks could be observed at the centre of the beam. A load cell was used to measure the applied load on the beam and the data was recorded using a separate wired data logger. The beam was incrementally loaded until the yield point (the point when the first flexural crack appeared in the beam). The test was continued until, a drop-in load resistance was observed with increase in the strain values.

The readings of the VWSG of present invention were compared with the value of the strain measured by using two ESG gauges and TYPE 2 VWSG installed alongside. The verification of the strain measurement was done using two separate strain gauges (TYPE 2 VWSG and 60 mm ESGs) attached to two distinct wired physical data loggers. Apart from the crack-meter attached to VWSG, the crack width was measured manually using a fixed scale crack-meter. The readings of the sensors attached to wireless system of the present invention were extracted from the dashboard hosted on the cloud server.

The present system has been evaluated on the following parameters.

Figure 4:
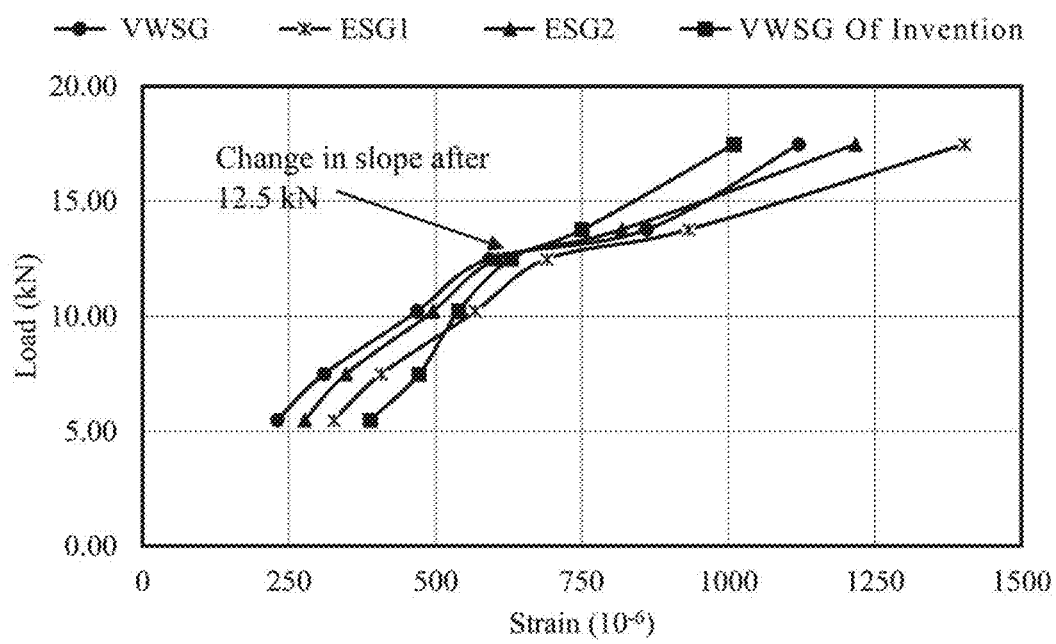
FIG. 4 depicts load strain curve of all the strain gauges.
Figure 5A:
FIGS. 5a, 5b and 5c depicts load, strain and load strain curves of vibrating wire strain gauge.
Figure 5B:
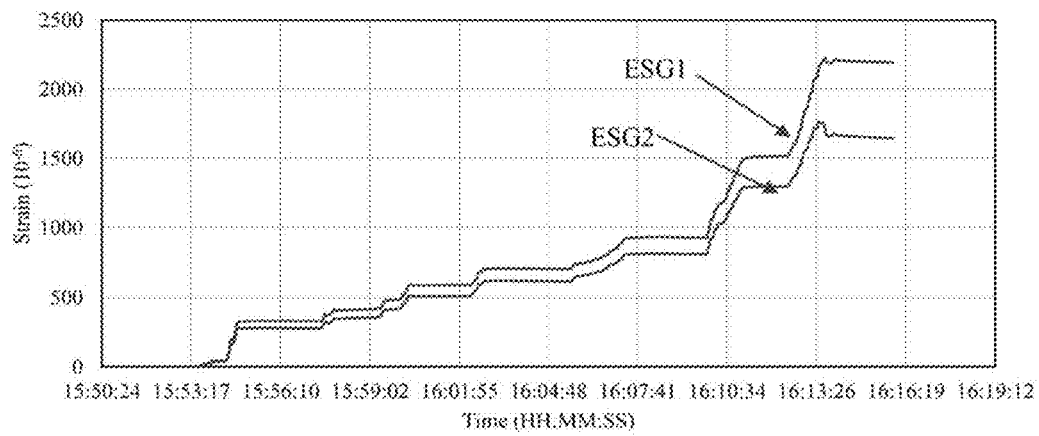
Figure 5C:
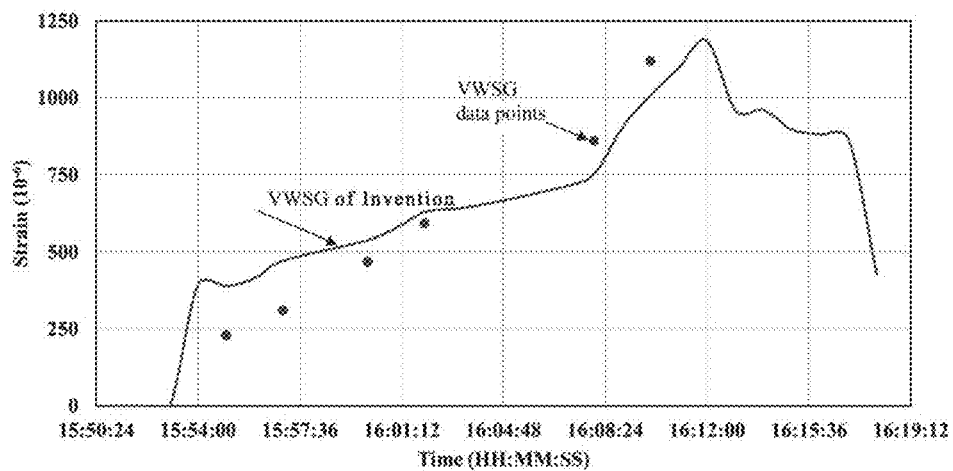
Figure 6:
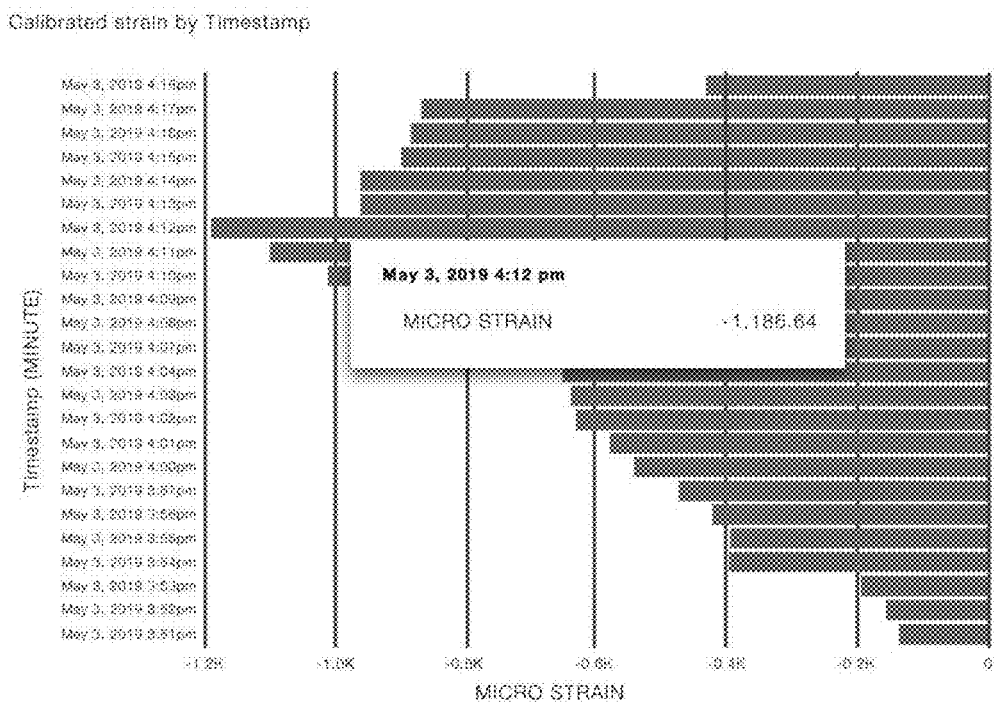
FIG. 6 depicts dashboard for strain values from beam compression test.

Real-time wireless data transmission
Remote monitoring
Use of communication module to transmit the data
Alert system
Accuracy of the data displayed
Forecast of structural integrity data Load strain curves of all the strain gauges i.e. VWSG of the present invention, TYPE 2 VWSG, ESG1, ESG2 are depicted in FIG. 4. It can be observed that readings from Type 1 VWSG (wireless) used in the experiment essentially follows the same trend as other sensors attached to conventional datalogger. The applied load against timestamp is shown in FIG. 5 (a). The strain recorded from ESG1 and ESG2 are shown in FIG. 5(b) and the strain (unit: microstrain) recorded from the VWSG of present invention are shown in FIG. 5(c) and FIG. 6. The strain from TYPE 2 VWSG were recorded manually and was compared in Table 1 with other strain values. It is quite evident, from FIG. 4, that the strain readings sent by Type 1 VWSG (wireless) via wireless transmission displayed a similar trend with increase in the load when compared to readings from other strain sensors which was attached to a conventional datalogger. However, its strain slope changed after 12.5 kN since at this load, the cracks started to appear in the beam (Table 1).

TABLE 1

Comparison of all strain recorded from different sensors

| | | | Conventional data logger (wired) | | | | Present invention (wireless) | | |
|---|---|---|---|---|---|---|---|---|---|
| Time-stamp | Load (kN) | Deflection (mm) | Temp (° C.) | VWSG strain ($\mu\varepsilon$)* | Crack width (mm) | ESG 1 ($\mu\varepsilon$)* | ESG 2 ($\mu\varepsilon$)* | Temp (° C.) | VWSG strain ($\mu\varepsilon$)* | Crack width (mm) |
| 15:55:01 | 5.49 | 6.09 | 35 | 230.2 | 0 | 326.66 | 276.96 | 35.50 | 389.03 | 0 |
| 15:57:56 | 7.49 | 8.66 | 35 | 309.9 | 0 | 407.64 | 347.27 | 35.50 | 471.64 | 0.10 |
| 16:00:15 | 10.21 | 12.21 | 35 | 468.5 | 0.5 | 567.51 | 495.42 | 35.50 | 539.08 | 0.10 |
| 16:02:38 | 12.48 | 15.06 | 35 | 591.8 | 0.5 | 691.3 | 606.28 | 35.50 | 628.61 | 0.10 |
| 16:08:09 | 13.75 | 19.44 | 35 | 860.6 | 0.75 | 932.14 | 818.23 | 35.60 | 750.67 | 0.10 |
| 16:10:53 | 17.47 | 28.79 | 35 | 1120.2 | 1.00 | 1403.43 | 1217.19 | 35.60 | 1009.84 | 0.20 |

*All the strains are compressive strain. The values were recorded in negative, however, for the ease of visualization the values are written as positive.
*Crack Width from the two devices is not compared as both devices were at different locations.

The crack-meter of gauge length of 400 mm measures cumulative width of multiple crack within the length. The forecast of crack-width was displayed in real-time with increasing load (FIG. 7).

Experiment 2: Direct Compression Test

The system was also evaluated for checking the accuracy of the data recorded on the dashboard. The VWSG was stressed using a bench type screw jack. The loads were applied in steps and the data was recorded manually and from the dashboard as well. The strain in the VWSG was determined by measuring the distance between points A and B manually using a 0.01 accuracy dial gauge. The manually recorded strains were compared with the strain values recorded by the wireless system and displayed on the dashboard. Similarly, the vibrating wire (VW) crack meter was assessed using a Vernier Calliper with a precision of 0.02 mm and the values displayed on the remote dashboard matched precisely with those of the Vernier Calliper. The manual measurements were compared with the dashboard values as shown in FIG. 5a, FIG. 5b, FIG. 5c and FIG. 8, indicating consistency in the trend and range of values displayed.

What is claimed is:

1. A system for structural health monitoring using internet of things and machine learning, said system comprising:
   at least one sensor (S) connected to at least one node processor (1, 1a, 1b, 1c, . . . 1n);
   two or more types of gateways;
   a communication module comprising a closed network communication module and an open network communication module;
   a trigger function software client; and
   a graphic user interface or dashboard,
   wherein said system communicates between the sensor (S), the node processor (1, 1a, 1b, 1c, . . . 1n) and the two or more gateways through said communication module (C) to identify structural anomaly on real-time basis and to predict structural integrity of civil structures by evaluating feasibility of wireless structural health monitoring (SHM) of civil structures encompassing internet-of-things (TOT) and machine learning models,
   wherein said two or more types of gateways comprising:
      a first type of gateway, wherein the first type of gateway is a physical device gateway that communicates data wirelessly with the node processor via closed network communication module; and
      a second type of gateway, wherein the second type of gateway is a cloud gateway that wirelessly authenticates and communicates data with the physical device gateway via open network communication module,
   wherein
   said node processor converts raw sensor data into engineering data and transfers said engineering data to said physical device gateway via said closed network communication module,
   said physical device gateway aggregates and validates said engineered data to the cloud gateway through a secure communication protocol,
   said trigger function software client evaluates the incoming real-time data on the cloud gateway and allows trigger function to route said engineering data to cloud storage and cloud analytics and alert depending upon predefined keywords or threshold on the cloud gateway,
   said system being capable of connecting one or more machine learning models to help user identify structural behavior anomalies and forecast trends.

2. The system as claimed in claim 1, wherein the physical device gateway to the cloud gateway data transfer incorporates physical device-to-cloud data telemetry to determine physical device status and ensures transmission of said data to a respective internet of things virtual device on cloud based on credentials-based data.

3. The system as claimed in claim 1, wherein said cloud gateway to physical device gateway data transfer sends commands/update of algorithm to the respective node processor and tracks the delivery of messages.

4. The system as claimed in claim 1, wherein said secure communication protocol to authenticate communication between the physical device gateway and the cloud gateway is MQTT, AMQP and HTTPS.

5. The system as claimed in claim 1, wherein said cloud based analytics is capable of querying data to extract relevant information for the purpose of improving the accuracy of prediction and enables users to visualize the data as a dataset for direct visualization on dashboard.

6. The system as claimed in claim 1, wherein said cloud storage stores data is in real time and is capable of being connected in real time to machine learning models and data visualization platform.

7. The system as claimed in claim 1, wherein said system generates an alarm by identifying the topic or connection string identity to which physical device messages are published and allows access control by defining policies to determine which Internet of things virtual device and which subscribers can communicate with the topic,
wherein said alarm is in the form of emails or text or social media messages.

8. The system as claimed in claim 7, wherein multiple subscribers can subscribe to a single topic to receive alerts via text, email and social media messages.

9. The system as claimed in claim 1, wherein a single node processor can connect multiple sensors.

10. The system as claimed in claim 1, wherein said data transfer between said node processor, said physical device gateway and said cloud gateway can connect millions of sensors, thereby eliminating the need to increase physical size of data acquisition system.

11. The system as claimed in claim 1, wherein said closed network communication module is long range wide area network (LoRaWAN).

12. The system as claimed in claim 1, wherein said system allows for a single statement on the dashboard to reflect the correlation of multiple forecasts based on the analysis of multiple parameters.

13. The system as claimed in claim 12, wherein said statement on dashboard changes in real-time based on the change in forecast of the multiple parameters and their correlation.

14. The system as claimed in claim 13, wherein the dashboard displays forecast of upper-bound, lower-bound and expected parameter values measured by the sensors.

15. The system as claimed in claim 1, wherein said system is a scalable system enabling data communication between node-processor, physical device gateway and cloud gateway in wireless mode.

16. The system as claimed in claim 1, wherein said system identifies real-time structural anomaly through said neural network.

17. The system as claimed in claim 1, wherein said system forecasts future damage detection and provides forecast trends through said machine learning models.

18. The system as claimed in claim 1, wherein said machine learning models comprises random cut forest, support vector machine, principal component analysis, K-means clustering machine and neural network.

19. The system as claimed in claim 18, wherein said random cut forest, support vector machine, principal component analysis, K-means clustering machine is used to predict future values of parameters that constitute structural member behavior under applied loads.

20. A method to operate a system for monitoring the health of civil and mechanical engineering structures on real-time basis to identify and predict future structural integrity of said structures through wireless transmission of data, the system comprising:
  at least one sensor (S) connected to at least one node processor (1, 1a, 1b, 1c, . . . 1n);
  two or more types of gateways;
  a communication module comprising a closed network communication module and an open network communication module;
  a trigger function software client; and
  a graphic user interface or dashboard,
wherein said system communicates between the sensor (S), the node processor (1, 1a, 1b, 1c, . . . 1n) and the two or more gateways through said communication module (C) to identify structural anomaly on real-time basis and to predict structural integrity of civil structures by evaluating feasibility of wireless structural health monitoring (SHM) of civil structures encompassing internet-of-things (TOT) and machine learning models,
wherein said two or more types of gateways comprising:
  a first type of gateway, wherein the first type of gateway is a physical device gateway that communicates data wirelessly with the node processor via closed network communication module; and
  a second type of gateway, wherein the second type of gateway is a cloud gateway that wirelessly authenticates and communicates data with the physical device gateway via open network communication module,
wherein
  said node processor converts raw sensor data into engineering data and transfers said engineering data to said physical device gateway via said closed network communication module,
  said physical device gateway aggregates and validates said engineered data to the cloud gateway through a secure communication protocol,
  said trigger function software client evaluates the incoming real-time data on the cloud gateway and allows trigger function to route said engineering data to cloud storage and cloud analytics and alert depending upon predefined keywords or threshold on the cloud gateway,
  said system being capable of connecting one or more machine learning models to help user identify structural behavior anomalies and forecast trends,
said method comprises the steps of:
  deploying said at least one sensor or actuator to collect raw sensor data;
  connecting each of said sensor to said at least one node processor to convert said raw sensor data into engineering data;
  transferring said engineered data to said physical device gateway via said closed network communication module where said physical device gateway aggregates and validates said engineering data;
  transmission of said validated data from said physical device gateway to said cloud gateway through a secure communication protocol;
  transmission of said validated data from said cloud gateway to said trigger function software client that evaluates the incoming real-time data on the cloud gateway and to trigger function to route said real-time data to said cloud storage or cloud analytics or alert system; and display of said data as the dataset on dashboard wherein conclusive conditional statement about real-time structural anomalies and forecast trends based on correlated analytics of multiple parameters is displayed;

wherein said method employs machine learning models and Internet of things to predict the future maintenance and identity structural anomalies of civil and mechanical engineering structures through wireless data transfer enabling users to take early decisions on maintenance and rehabilitation.

* * * * *